(12) United States Patent
Pan

(10) Patent No.: US 9,423,550 B2
(45) Date of Patent: Aug. 23, 2016

(54) BACKLIGHT MODULE HAVING A LIGHT SCATTERING UNIT FOR SCATTERING LIGHT ENTERING THE LIGHT GUIDE PLATE AND DISPLAY DEVICE HAVING THE SAME

(71) Applicants: BOE TECHNOLOGY GROUP CO., LTD., Beijing (CN); Chengdu BOE Optoelectronics Technology Co., Ltd., Chengdu, Sichuan Province (CN)

(72) Inventor: Jianwei Pan, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu, Sichuan Province (CN)

( * ) Notice: Subject to any disclaimer, the term of this patent is extended or adjusted under 35 U.S.C. 154(b) by 37 days.

(21) Appl. No.: 14/448,477

(22) Filed: Jul. 31, 2014

(65) Prior Publication Data

US 2015/0277022 A1    Oct. 1, 2015

(30) Foreign Application Priority Data

Mar. 28, 2014    (CN) .......................... 2014 1 0124135

(51) Int. Cl.
*F21V 8/00*    (2006.01)

(52) U.S. Cl.
CPC ............ *G02B 6/0025* (2013.01); *G02B 6/0028* (2013.01); *G02B 6/0055* (2013.01); *G02B 6/0088* (2013.01)

(58) Field of Classification Search
CPC .. G02B 6/0025; G02B 6/0028; G02B 6/4202; G02B 6/4203; F21V 2200/13; F21V 2200/20
See application file for complete search history.

(56) References Cited

U.S. PATENT DOCUMENTS 3,779,628 A * 12/1973 Kapron ................ G02B 6/4203
385/43
2006/0002141 A1* 1/2006 Ouderkirk ............ G02B 6/0001
362/609

(Continued)

FOREIGN PATENT DOCUMENTS

CN    202532386 U    11/2012
CN    103017024 A    4/2013
KR    10-2007-0080410 A    8/2007

OTHER PUBLICATIONS

Office Action dated Oct. 14, 2015 issued in corresponding Chinese Application No. 201410124135.9.

*Primary Examiner* — Karabi Guharay
*Assistant Examiner* — Steven Horikoshi
(74) *Attorney, Agent, or Firm* — Math, Goldberg & Meyer; Joshua B. Goldberg; Christopher Thomas

(57) ABSTRACT

The present invention provides a backlight module and a display device. The present invention can solve the problem that a hot spot in a marginal portion of a light guide plate results in non-uniform brightness of emitted light from a backlight module. The backlight module comprises a light guide plate and a plurality of light sources, the light guide plate comprising a light incident surface, the plurality of light sources being arranged opposite to the light incident surface of the light guide plate. The backlight module further comprises a light scattering unit arranged between the plurality of light sources and the light incident surface of the light guide plate, and the light scattering unit is used for scattering and irradiating light rays from the plurality of light sources to the light guide plate. The display device of the present invention comprises the backlight module as described above.

11 Claims, 5 Drawing Sheets

(56) References Cited

U.S. PATENT DOCUMENTS

| | | | |
|---|---|---|---|
| 2006/0072339 A1* | 4/2006 | Li | G02B 6/0013 362/608 |
| 2007/0253216 A1* | 11/2007 | Watanabe | G02B 6/0028 362/601 |
| 2009/0102763 A1 | 4/2009 | Border et al. | |
| 2011/0227487 A1* | 9/2011 | Nichol | G02B 6/0018 315/158 |
| 2011/0305002 A1* | 12/2011 | Lim | G02B 6/0028 362/84 |
| 2014/0160792 A1* | 6/2014 | Chen | G02B 6/0036 362/610 |
| 2014/0169034 A1* | 6/2014 | Chen | G02B 6/0028 362/612 |

* cited by examiner

PRIOR ART

BACKLIGHT MODULE HAVING A LIGHT SCATTERING UNIT FOR SCATTERING LIGHT ENTERING THE LIGHT GUIDE PLATE AND DISPLAY DEVICE HAVING THE SAME

FIELD OF THE INVENTION

The present invention relates to the field of display technology, and particularly relates to a backlight module and a display device.

BACKGROUND OF THE INVENTION

Liquid crystal displays have been widely used due to their excellent quality. However, as liquid crystal itself emits no light, a backlight module is required to provide light necessary for displaying images. In order to guarantee a good effect when viewed from all angles, liquid crystal display screens have to meet the requirement of uniform brightness. It is thus required that the brightness of the emitted light from the backlight module must be uniform.

Side entering type backlight modules have been the mainstream of design of backlight modules. However, for a side entering type backlight module, as shown in FIG. 1, a light bar 2 has a plurality of point light sources, for example, LED (Light Emitting Diode) lamps 3 (approximate to point light sources). The space between adjacent LED lamps 3 is A, and the distance from light emitting surfaces of the LED lamps to light incident surface 12 of a light guide plate 1 is B. As the LED lamps 3 have a certain light emitting angle $\alpha$, a region 4 (i.e., hot spot, also referred to as glow-worm effect) not covered by the emitted light of the light bar, is generated in the marginal portion 11 of the light guide plate. Due to low brightness of the hot spot, the brightness of the emitted light from the backlight module is caused to be non-uniform. In general, the larger A is, and the smaller B is, thus the phenomenon that the brightness of emitted light from the backlight module is not uniform is more prominent.

The inventor(s) found that the prior art at least has the following problems. With the continuous increase of the luminous efficiency and power of the LED lamps, the number of LED lamps required by a single light guide plate is reduced, and the space A between lamps is continuously increased. As a result, the hot spot becomes an increasingly serious problem, which is disadvantageous to border narrowing of the backlight modules, and also adversely affects the display quality of the display devices. In addition, if the brightness problem of the hot spot cannot be solved well, it is unable to introduce LED lamps of greater luminous efficiency and power, and then it is disadvantageous to reduction of the production cost of products.

SUMMARY OF THE INVENTION

Technical problems to be solved by the present invention include providing a backlight module with uniform brightness of emitted light and a display device, in view of the problem that a hot spot in a marginal portion of a light guide plate results in non-uniform brightness of emitted light from a backlight module.

The present invention provides a backlight module, comprising a light guide plate and a plurality of light sources, the light guide plate comprising a light incident surface, the plurality of light sources being arranged opposite to the light incident surface of the light guide plate, wherein the backlight module further comprises a light scattering unit arranged between the plurality of light sources and the light incident surface of the light guide plate, and the light scattering unit is used for scattering and irradiating light rays from the plurality of light sources to the light guide plate.

The backlight module of the present invention comprises the light scattering unit that scatters light rays entering therein. In this way, light rays from the light sources become more uniform after being scattered by the light scattering unit, and can irradiate all regions in the marginal portion of the light guide plate. There will be no hot spot formed in the marginal portion of the light guide plate, so that the emitted light in the marginal portion of the light guide plate becomes more uniform.

Preferably, the light scattering unit is a transparent light scattering bar in which scattering particles are provided to scatter light rays entering the light scattering bar.

More preferably, the light scattering bar is cylindrical.

Preferably, one side, close to the light sources, of the light scattering unit is provided with a reflecting assembly used for reflecting light rays emitted from the light scattering unit back to the light scattering unit.

Preferably, the backlight module further comprises a light guide unit used for guiding light rays from the light sources into the light scattering unit.

More preferably, the light guide unit comprises a plurality of transparent light guide bars, one end of each of which is arranged at light emergent surfaces of the light sources and the other end thereof is connected to the light scattering unit.

More preferably, at least two light guide bars are connected to different positions of the light emitting surface of each of the light sources, and the light guide bars are connected to different positions of the light scattering unit.

More preferably, the front faces of the light sources are in contact with the light scattering unit, and the light guide bars connect the sides of the light sources to the light scattering unit.

More preferably, reflecting material is arranged on the outer surfaces of the light guide bars.

Even more preferably, the reflecting material is silver.

More preferably, at the junction of the light guide bars and the light scattering unit, provided is a microstructure used for scattering light rays from the light sources, and the microstructure consists of a plurality of projections or recesses.

More preferably, a light collecting unit for collecting light rays from the light sources and irradiating the light rays into the light guide bars is provided between the light guide bars and the light sources.

More preferably, the light collecting unit is a conical reflecting barrel, one end of which having a larger diameter is connected to the light emitting surfaces of the light sources while the other end thereof having a smaller diameter is connected to one end of each of the light guide bars.

The present invention further provides a display device comprising the backlight module above. As the brightness of the emitted light from the backlight module is relatively uniform, the display quality of the display device is further improved.

Figure 1:
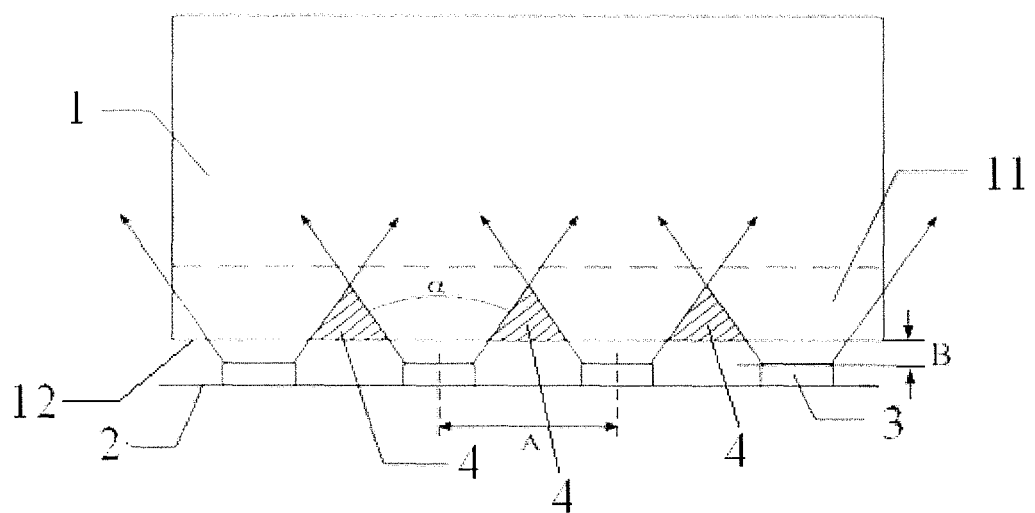
FIG. 1 is a schematic diagram of formation of a hot spot in a light guide plate in the prior art.

REFERENCE NUMERALS 1. light guide plate; 11. marginal portion of light guide plate; 12. light incident surface; 2. light bar; 3. LED lamp; 4. region not covered by emitted light of light bars; 5. light scattering bar; 6. light guide bar; 7. conical reflecting barrel.

DETAILED DESCRIPTION OF THE EMBODIMENTS

To make a person skilled in the art better understand the technical solution of the present invention, the present invention will be further described below in details in conjunction with accompanying drawings and specific implementations. It is apparent that the embodiments described herein are merely parts but not all of embodiments of the present invention. Other embodiments may be obtained by a person skilled in the art without any creative effort, and all these embodiments should be considered to be within the protection scope of the present invention.

Embodiment 1

This embodiment provides a backlight module, as shown in FIG. 2 to FIG. 8, comprising a light guide plate 1 and a plurality of light sources for emitting light. The light sources may be LED lamps 3. Of course, other types of light sources may be used. In this embodiment, description is given by using LED lamps 3 as the light sources. The light guide plate 1 comprises a light incident surface 12 and a plurality of LED lamps 3 are arranged opposite to the light incident surface 12 of the light guide plate 1. That is, the plurality of LED lamps 3 are arranged outside the light incident surface 12 of the light guide plate 1, and are arranged in a line.

The backlight module in this embodiment further comprises a light scattering unit for scattering and irradiating light rays from the plurality of LED lamps 3 to the light guide plate 1. The scattered light rays are irradiated to the light guide plate 1, then are reflected for many times in the light guide plate 1, and finally emitted in a form of surface light sources.

Preferably, the light scattering unit is a transparent light scattering bar 5. The light scattering bar 5 is arranged between the light incident surface 12 of the light guide plate 1 and the LED lamps 3. It is preferably to arrange the light scattering bar 5 close to the LED lamps 3. Scattering particles are provided in the light scattering bar 5 to scatter light rays entering the light scattering bar 5, so that the light rays emitted from the light scattering bar 5 become more uniform.

To make the light rays after being scattered by the light scattering bar 5 more uniform, preferably, the light scattering bar 5 in this embodiment is cylindrical. Apparently, the light scattering bar 5 may be in other shapes, for example, cuboid.

The light rays collide with the scattering particles in the light scattering bar 5 to radiate outward. Some of the light rays will return to the direction of the LED lamps 3 instead of entering the light guide plate 1. Preferably, one side, close to the LED lamps 3, of the light scattering bar 5 is provided with a reflecting assembly 14 used for reflecting light rays (light rays not emitted to the light guide plate 1) emitted from the light scattering bar 5 back to the light scattering bar 5 (of course, the reflecting assembly 14 is incapable of preventing light of the LED lamps from entering the light scattering bar 5), in order to improve the utilization ratio of the light rays.

The reflecting assembly may be made of high reflecting material (for example, silver or aluminum) as a reflecting plate. The reflecting plate is not limited to being rectangular in shape, and it may be arc in shape. The reflecting plate is arranged at one side, away from the light guide plate 1, of the light scattering bar 5. In terms of structural form, the reflecting assembly may be integrated with the LED lamps 3, or attached to the surface of one side, close to the LED lamps 3, of the light scattering bar 5.

Preferably, the backlight module in this embodiment further comprises a light guide unit used for guiding light rays from the LED lamps 3 into the light scattering bar 5.

More preferably, the light guide unit comprises a plurality of transparent light guide bars 6, one end of each of the transparent light guide bars 6 is arranged at light emitting surfaces of the LED lamps 3 and the other end thereof is connected to the light scattering bar 5. The LED lamps 3 may be connected to the light guide bars 6 in such a manner that a base accommodating the LED lamps 3 may be made of the same material (but the material is not limited to resin, and other materials may be used) as that of the light guide bars 6, and the base accommodating the LED lamps 3 is integrally molded with the light guide bars 6 (the way of molding may be a way of precise injection molding). The connection between the light guide bars 6 and the light scattering bar 5 may be achieved by fusing the connection portions of the two together.

Figure 6:
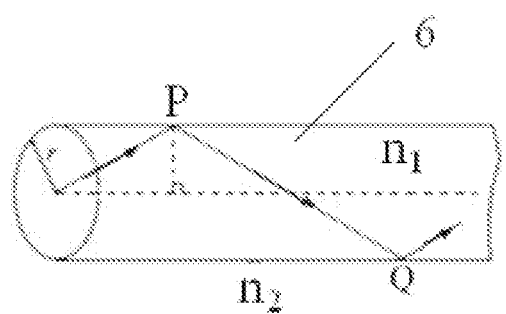
FIG. 6 is a schematic diagram of full-reflection of light in the light guide bars of Embodiment 1 of the present invention.
Figure 7:
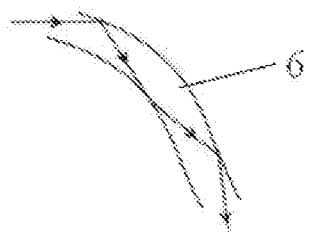
FIG. 7 is a schematic diagram of propagation paths of light rays in the light guide bars of Embodiment 1 of the present invention.

The light guide bars 6 are used as the light guide unit because the light rays are propagated in a manner of full-reflection inside the light guide bars 6. The light source utilization ratio of the light guide bars 6 is high, and the reflectivity may reach 92%-95%. As shown in FIG. 6, when the light rays are propagated in the light guide bars 6, as the refractivity $n_1$ of the light guide bars 6 is greater than the refractivity $n_2$ of air, light will be fully reflected at points P and Q. FIG. 7 shows propagation paths of light in the light guide bars 6.

Figure 2:
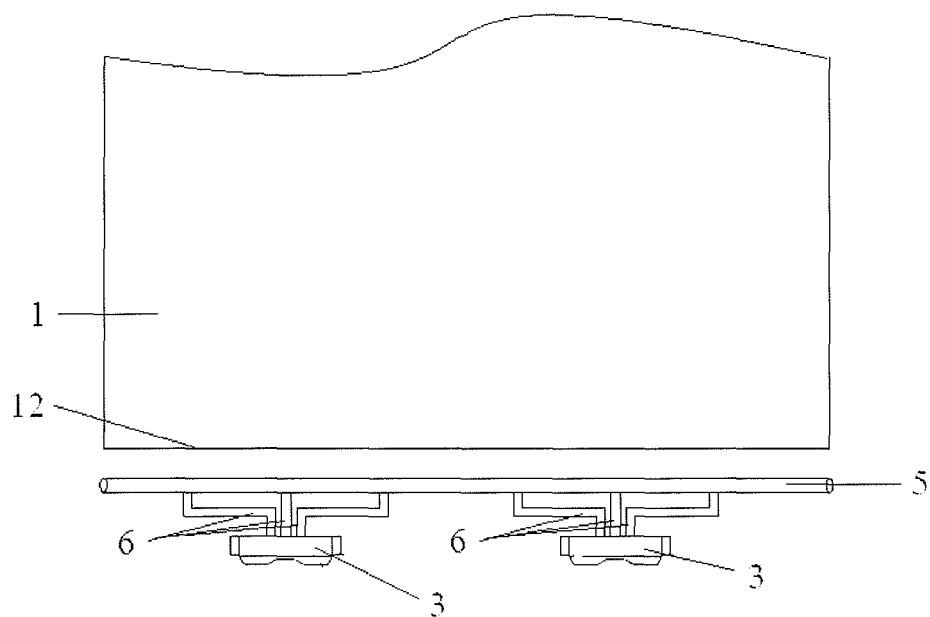
FIG. 2 is a structural schematic diagram of a backlight module according to Embodiment 1 of the present invention.
Figure 3:
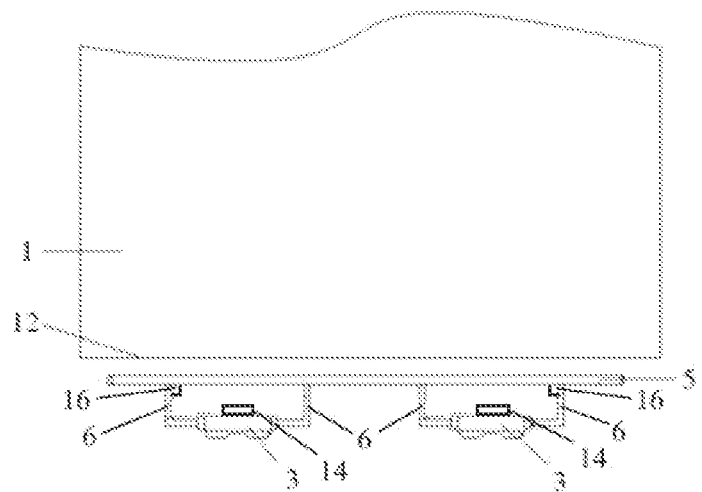
FIG. 3 is another structural schematic diagram of the backlight module of Embodiment 1 of the present invention.
Figure 9:
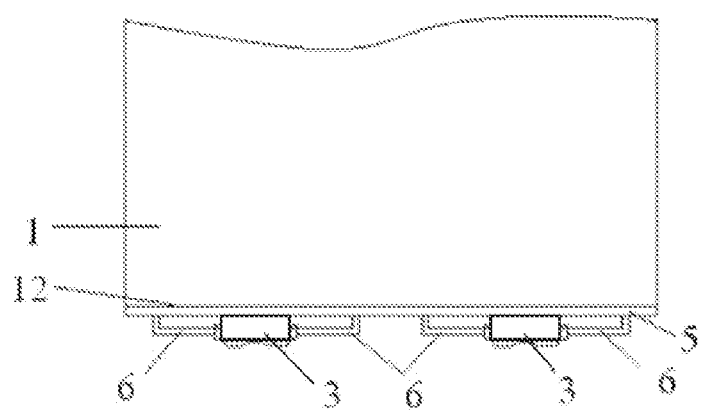
FIG. 9 is another structural schematic diagram of the backlight module of Embodiment 1 of the present invention.

The light guide bars 6 may be rotated, bent and overlapped, so that the light guide angle and the length of the light guide bars 6 may be changed. In this way, the light guide bars 6 connected between the LED lamps 3 and the light scattering bar 5 may be flexibly arranged according to actual demands; furthermore, the light emitting surfaces of the LED lamps 3 may also be flexibly designed. As shown in FIG. 2, for example, the light emitting surfaces of the LED lamps 3 may be surfaces (front surfaces) parallel and opposite to the light incident surface 12 of the light guide plate 1. As shown in FIG. 3, the sides, vertical to the light incident surface 12, of the LED lamps 3, may be used as the light emitting surfaces. In this case, the light rays emitted from the LED lamps 3 may enter the light scattering bar 5 from the sides via the light guide bars 6. That is, the light guide bars 6 may be preferably arranged in a plane of the LED lamps 3 (arranged in the thickness direction of the LED lamps 3). Therefore, the front surfaces of the LED lamps 3 may contact the light scattering bar 5 (as shown in FIG. 9), so that the distance from the LED lamps 3 to the light incident surface 12 of the light guide plate 1 depends on the width of the light scattering bar 5 only. This is advantageous in reducing the width of the border of the backlight module.

Even more preferably, as shown in FIG. 2, at least two light guide bars 6 are connected to different positions of the light emitting surface of each of the LED lamps 3, and the light guide bars 6 are also connected to different positions of the light scattering bar 5. In this way, the light rays from the LED lamps 3 may be allowed to enter the light scattering bar 5 in a more scattered way, thereby improving the utilization ratio of the light sources.

More preferably, the outer surfaces of the light guide bars 6 are provided with reflecting material. Even more preferably, the reflecting material is silver. Of course, other reflecting materials may be possible, for example, aluminum and the like.

Figure 8:
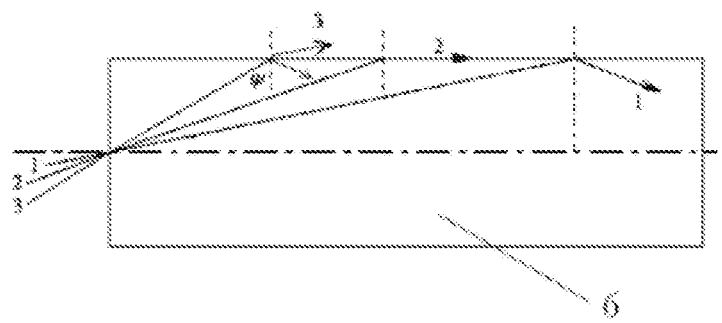
FIG. 8 is a schematic diagram of propagation paths of light rays in different positions of the light guide bars of Embodiment 1 of the present invention.

As shown in FIG. 8, some of the light rays (as shown by light rays 3 in FIG. 8) cannot be fully reflected at the light incident parts of the light guide bars 6 close to the LED lamps 3, as their incident angle $\psi$ is less than the critical angle of incidence for full-reflection, that is, refraction and reflection of light occur at the same time. In this regard, it is required to add a reflecting film on the outer surfaces of the light incident parts of the light guide bars 6 close to the LED lamps 3. Of course, the light guide bars 6 may be entirely provided with an additional reflecting film. The reflecting film may be made of materials having a high reflectivity to light, for example, silver or the like. The reflecting film may be affixed or plated onto the surfaces of the light guide bars 6. In this way, the light rays at the light incident parts of the light guide bars 6 close to the LED lamps 3 may be allowed to enter the light guide bars 6 again in a reflection manner, and thus the utilization ratio of the light rays is improved.

Preferably, for the light rays (as shown by light rays 3 in FIG. 8) that cannot be fully reflected at the light incident parts of the light guide bars 6 close to the LED lamps 3, a light collecting unit for collecting light rays from the LED lamps 3 and irradiating the light rays into the light guide bars 6 may be provided between the light guide unit and the LED lamps 3. The light collecting unit may be a conical reflecting barrel 7, one end of the conical reflecting barrel 7 having a larger diameter is connected to the light emitting surfaces of the LED lamps 3 while the other end thereof having a smaller diameter is connected to one end of each of the light guide bars 6. After providing a conical reflecting barrel 7 between the light guide unit and the LED lamps 3, the light rays emitted from the LED lamps will enter the light guide bars 6 after being reflected by the conical reflecting barrel 7. At this time, the propagation direction of the light rays may be changed, so that the light rays enter the light guide bars 6 in a more concentrated manner. The propagation distance of the light rays in the light guide bars 6 is thus shortened, and the utilization ratio of the light rays is improved. Meanwhile, one end of the conical reflecting barrel 7 having a larger diameter is connected to the light emitting surfaces of the LED lamps 3, so more light rays may be concentrated.

Preferably, for the backlight module in this embodiment, at the junction of the light guide bars 6 and the light scattering bar 5, provided is a microstructure 16 used for scattering light rays from the LED lamps 3, and the microstructure 16 consists of a plurality of projections or recesses. The projections or recesses may be semi-circular, conical or quadrate-tapered or the like in shape. The microstructure 16 may be made of materials having a good transmission of light, for example, polyethylene, polymethyl methacrylate and the like. In this way, the light rays from the LED lamps 3 may enter the light scattering bar 5 in a more uniform way, so that the light rays emitted from the light scattering bar 5 become more uniform too.

It can be understood that the light guide unit may be other light guide elements with high light ray reflectivity, for example, a light guide tube and the like. The light rays from the LED lamps 3 are reflected for many times in the light guide tube and then enter the light scattering bar 5, then scattered by the light scattering bar 5, and finally irradiate to the light guide plate 1.

Figure 4:
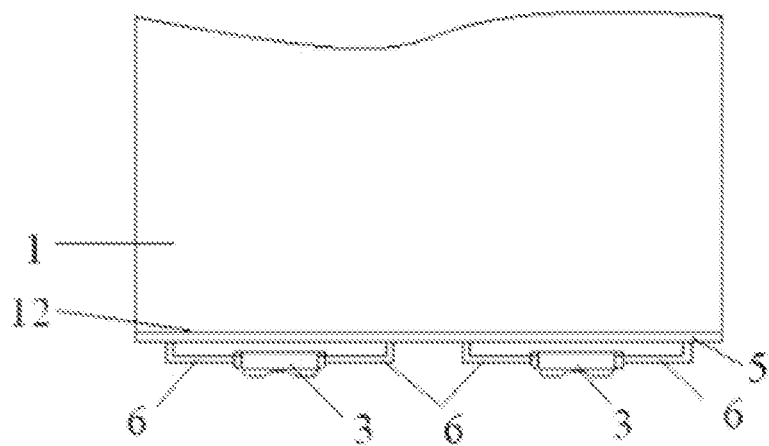
FIG. 4 is yet another structural schematic diagram of the backlight module of Embodiment 1 of the present invention.
Figure 5:
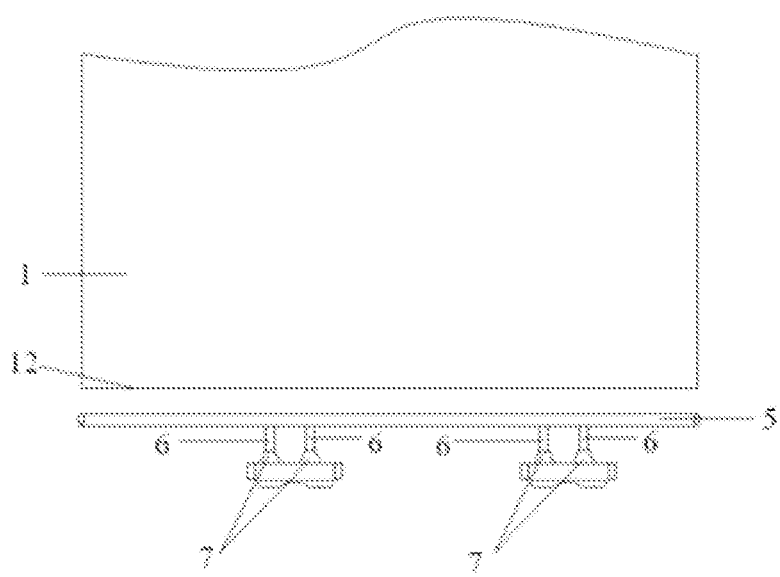
FIG. 5 is a fourth structural schematic diagram of the backlight module of Embodiment 1 of the present invention.

In this embodiment, the light scattering bar 5 may be made of the same material as that of the light guide plate 1, or made of material different from that of the light guide plate 1. When manufactured, the light scattering bar 5 is integrated with the light guide plate 1, with a structure as shown in FIG. 4, so as to further reduce the width of the border of the backlight module.

The backlight module in this embodiment comprises a light scattering bar 5 used for scattering the light rays, from the LED lamps 3, entering the light scattering bar 5. In this way, the light rays from the LED lamps 3 after being scattered by the light scattering bar 5 become more uniform, and can irradiate all regions in the marginal portion of the light guide plate 1. There will be no hot spot formed in the marginal portion of the light guide plate 1, so that the emitted light in the marginal portion of the light guide plate 1 becomes more uniform. As a result, the effect of emitted light of the marginal portion is improved, and it is adventurous to the design of border narrowing of the backlight module.

Embodiment 2

Figure 10:
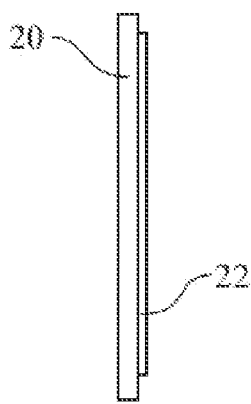
FIG. 10 is a display device including the backlight module of Embodiment 1 of the present invention.

This embodiment (as shown in FIG. 10) provides a display device 20 comprising the backlight module 22 as described in embodiment 1. Of course, the display device 20 further comprises an array substrate, a color film substrate or other known structures which will not be described herein in details.

The display device in this embodiment comprises the backlight module as above. As the brightness of the emitted light from the backlight module is uniform, the display quality of the display device is further improved.

The display device in this embodiment may be a liquid crystal display device, and additionally may be electronic paper, a mobile phone, a tablet computer, a TV set, a display, a laptop computer, a digital photo frame, a navigator or any products or components having a display function.

It should be understood that the above embodiments are just exemplary embodiments for illustrating the principle of the present invention. However, the present invention is not limited thereto. Various variations and improvements can be made by a person skilled in the art without departing from the spirit and essence of the present invention, and these variations and improvements should also be considered to be within the protection scope of the present invention.

The invention claimed is:

1. A backlight module, comprising a light guide plate and a plurality of light sources, the light guide plate comprising a light incident surface, the plurality of light sources being arranged opposite to the light incident surface of the light guide plate, wherein the backlight module further comprises a light scattering unit arranged between the plurality of light sources and the light incident surface of the light guide plate, and the light scattering unit is used for scattering and irradiating light rays from the plurality of light sources to the light guide plate;
wherein the backlight module further comprises a light guide unit used for guiding light rays from the light sources into the light scattering unit;
wherein the light guide unit comprises a plurality of transparent light guide bars, one end of each of the light guide bars is arranged at light emitting surfaces of the light sources and the other end thereof is connected to the light scattering unit; and
wherein the front faces of the light sources are in contact with the light scattering unit, and the light guide bars connect the sides of the light sources to the light scattering unit.

2. The backlight module according to claim 1, wherein the light scattering unit is a transparent light scattering bar in which scattering particles are provided to scatter light rays entering the light scattering bar.

3. The backlight module according to claim 2, wherein the light scattering bar is cylindrical.

4. The backlight module according to claim 1, wherein one side, close to the light sources, of the light scattering unit is provided with a reflecting assembly used for reflecting light rays emitted from the light scattering unit back to the light scattering unit.

5. The backlight module according to claim 1, wherein at least two light guide bars are connected to different positions of the light emitting surface of each of the light sources, and the light guide bars are connected to different positions of the light scattering unit.

6. The backlight module according to claim 1, wherein reflecting material is provided on the outer surfaces of the light guide bars.

7. The backlight module according to claim 6, wherein the reflecting material is silver.

8. The backlight module according to claim 1, wherein at the junction of the light guide bars and the light scattering unit, provided is a microstructure used for scattering light rays from the light sources, and the microstructure consists of a plurality of projections or recesses.

9. The backlight module according to claim 1, wherein a light collecting unit for collecting light rays from the light sources and irradiating the light rays into the light guide bars is provided between the light guide bars and the light sources.

10. The backlight module according to claim 9, wherein the light collecting unit comprises a conical reflecting barrel, one end of which has a larger diameter is connected to the light emitting surfaces of the light sources while the other end thereof has a smaller diameter and is connected to one end of the light guide bars.

11. A display device, comprising the backlight module according to claim 1.

* * * * *